J. M. JONES.
Sugar Skimmer.
No. 27,257.
Patented Feb. 21, 1860.
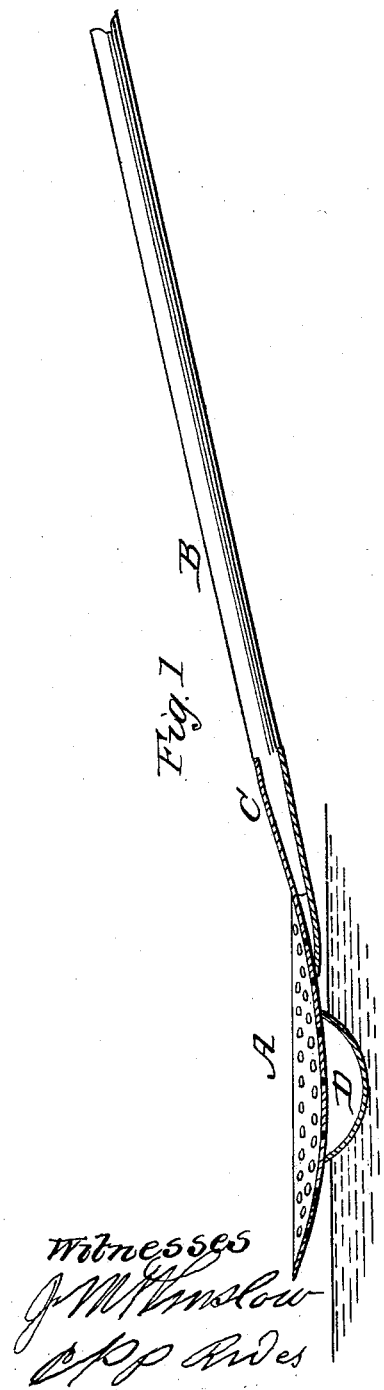
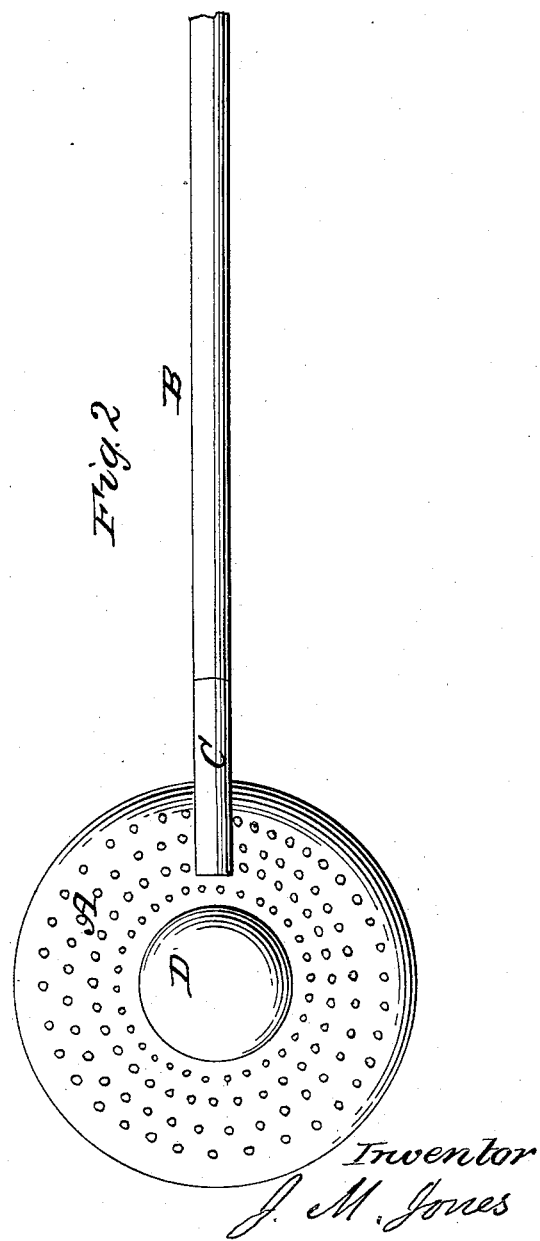

UNITED STATES PATENT OFFICE.

JOHN M. JONES, OF NEW ORLEANS, LOUISIANA, ASSIGNOR TO HIMSELF AND H. O. AMES, OF SAME PLACE.

IMPROVEMENT IN SKIMMERS FOR SUGAR-JUICES.

Specification forming part of Letters Patent No. 27,257, dated February 21, 1860.

*To all whom it may concern:*

Be it known that I, JOHN M. JONES, of the city of New Orleans, in the parish of Orleans and State of Louisiana, have invented a new and useful Improvement in Skimmers for Sugar and other Substances; and I do hereby declare that the following is a full, clear, and exact description of the same, reference being had to the accompanying drawings, forming part of this specification, in which—

Figure 1 is a central section of a skimmer with my improvement. Fig. 2 is a bottom view of the same.

Similar letters of reference indicate corresponding parts in both figures.

The object of my invention is to lighten the labor of skimming the sirup in the kettles or pans in the manufacture of sugar. The skimmer ordinarily used, consisting of a shallow perforated metal bowl attached to a pole, is heavy, and can only be used by the strongest hand on the plantation, for, being perforated, it does not float on the sirup, and its entire weight has to be supported by the operator not only in transferring the skimmings from one pan to another, but in letting the sirup drain from the perforations, and in the act of skimming it derives but little support from the sirup.

My invention consists in furnishing the skimmer with a float, which, resting on the sirup, will support it during the skimming operation, and also while any sirup that may be taken up with the skimmings drains through the perforations back into the kettle or pan.

To enable others skilled in the art to apply my invention, I will proceed to describe its construction and operation.

A is the bowl of the skimmer, attached to the pole B by a socket, C, in the usual manner. The bowl is made of the usual form, but, instead of being perforated all over, has no perforations for some distance round the center, and under this unperforated portion is placed the float D, which constitutes my invention. The said float is made by the attachment of a bowl-like piece of metal to the bottom of the skimmer in such a manner as to make an air-tight cavity of sufficient size to enable it to support the surrounding perforated portion of the bowl above the surface of the sirup. If preferable, the air-chamber may be composed of india-rubber, gutta-percha, or any other suitable air-tight material, or cork, or any sufficiently light and buoyant material may be substituted for the air-chamber.

The use of skimmers made wholly of wood has been essayed; but the great weight, when made of proper strength, and their increased gravity occasioned by absorption of moisture, render the labor of skimming very slow and severe. A sugar-skimmer made of wood would weigh probably ten times as much as those now commonly employed, which are made of the thinnest copper.

My improvement is intended for use in the skimming of sugar, and every variety of substances in solution or otherwise.

To use this skimmer it is placed on the surface of the sirup, and then tipped to bring its edge below the surface of the scum, and moved over the sirup to collect the scum within it. It is then brought to a horizontal position, as shown in Fig. 1, in which position the float supports the perforated portion above the surface of the sirup in the kettle or pan to allow any sirup to drain through the perforations, and when the draining is effected is moved over into the next kettle or pan in the train to discharge the scum thereinto. This last-described part of the operation is the only part that is really laborious with this skimmer.

Having thus described my invention, I claim and desire to secure by Letters Patent, as an improved article of manufacture—

A skimmer for sugar and other substances, composed of a metallic bowl, A, and an air-chamber or float, D, constructed and combined substantially as herein shown and described.

JOHN M. JONES.

Witnesses:
J. M. WINSLOW,
N. P. RIDER.